Feb. 16, 1943.  D. W. LEHTI ET AL  2,311,304
COMBINATION CRAWLER AND RAIL VEHICLE
Filed July 5, 1940  2 Sheets-Sheet 1
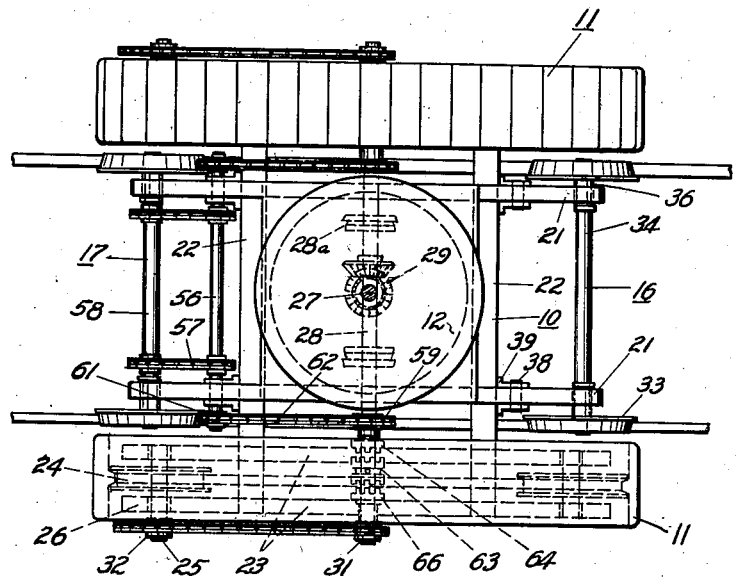
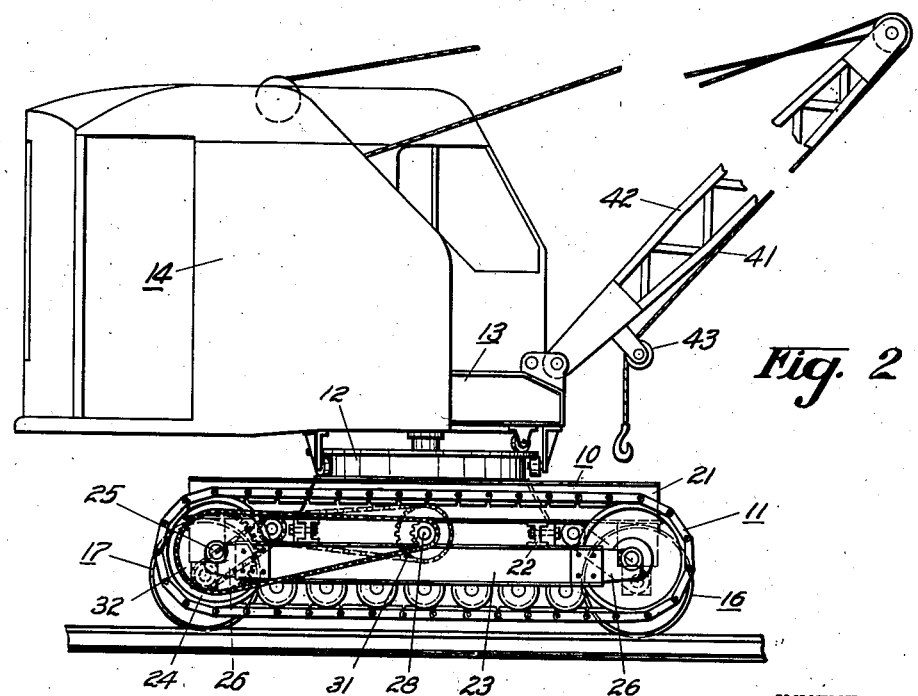
INVENTOR.
DAVID W. LEHTI
BY  LUTHER H CROW
Flournoy Corey
ATTORNEY.

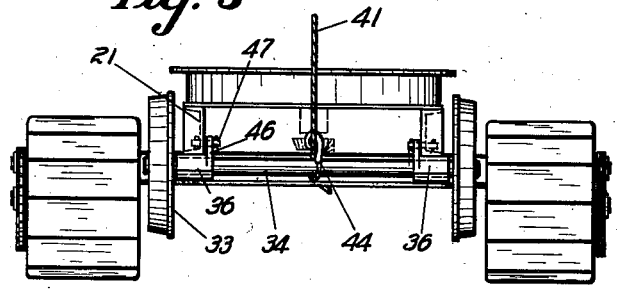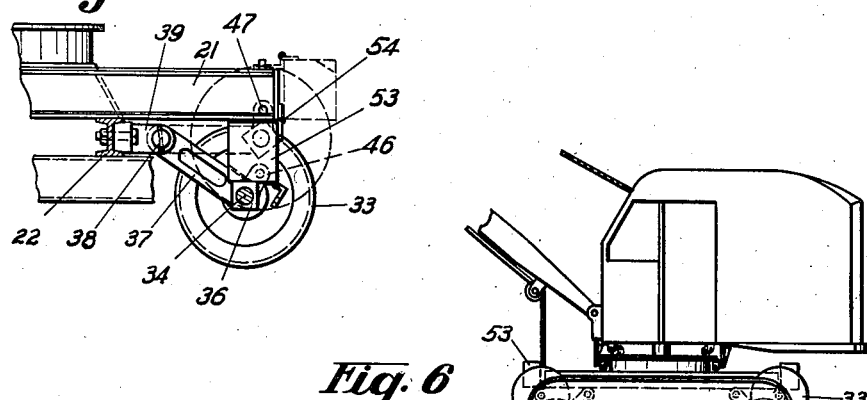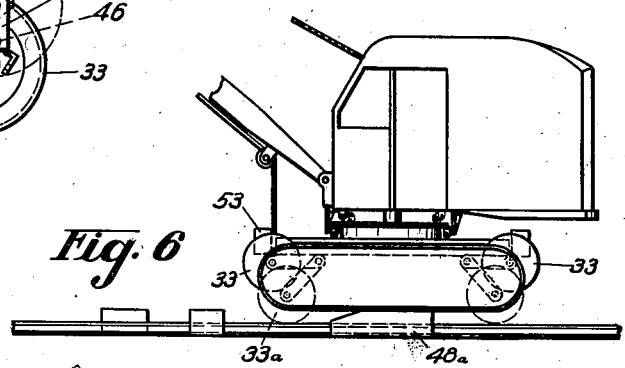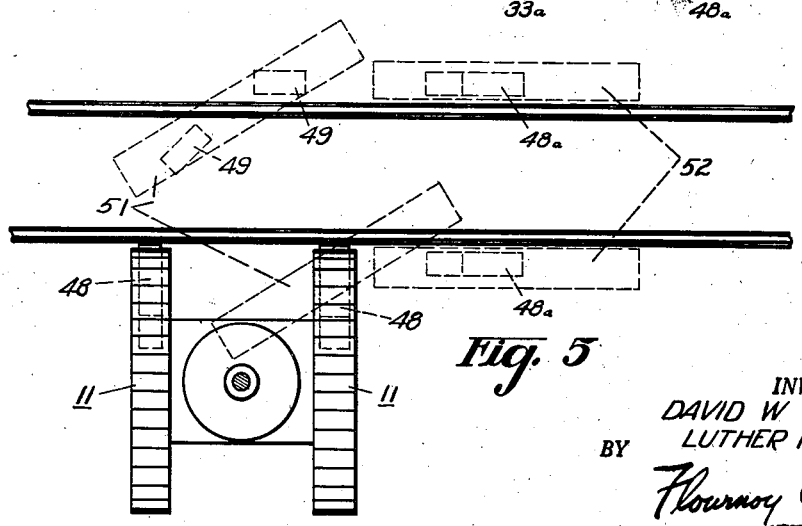

Patented Feb. 16, 1943

2,311,304

UNITED STATES PATENT OFFICE 2,311,304

COMBINATION CRAWLER AND RAIL VEHICLE

David W. Lehti and Luther H. Crow, Cedar Rapids, Iowa, assignors to Link-Belt Speeder Corporation, Chicago, Ill., a corporation of Illinois Application July 5, 1940, Serial No. 344,092

8 Claims. (Cl. 105—215)

This invention relates to combination highway and rail vehicles and has particular relation to means for interchangeably converting heavy vehicles, such as tractors, cranes, excavating shovels and the like, from highway or earth supported vehicles to rail supported vehicles. In heavy equipment, such as earth moving means, cranes, tractors and the like, the mobility and the usefulness of the equipment and scope of operation may be materially improved if the vehicle is adapted for use on rails as well as on highway and ground surfaces, but by the very nature, massiveness and weight of this equipment necessary in performing its functions, conversion from one form of support to the other has been difficult, and it has been necessary to apply relatively complicated mechanism of lifting jacks and the like for performing the change-over.

Our invention, however, contemplates the substitution of extremely simple, reliable and effective means for accomplishing the change-over so that the change-over may be accomplished quickly and with a minimum of parts and mechanism, to thus materially improve the facility and operation of the vehicle.

Such equipment as is here contemplated is usually supported for mobility over earth surfaces by means of endless tracks or "caterpillar" treads, the area of which is relatively large to support the heavy loads and distribute the load over large areas so that the unit loading is relatively small. The very nature of these endless tracks or wide tread wheels makes the change-over difficult. The loads are heavy and large masses must be employed to furnish the requisite strength.

It is, therefore, among the objects of our invention to provide simple, effective and quickly operable means for effecting change-over of the support of heavy equipment from earth borne to rail or highway wheel support and back to earth supported condition.

Another primary object of our invention is the provision, in devices employing endless treads, of simple inexpensive means for converting over such vehicles for comparatively high speed operation on rails or smooth road surfaces, to thus eliminate the wear and tear on the endless treads which are seldom adapted for operation at high speeds.

Another object of our invention is to provide means for selectively driving either the endless treads or the wheels from a single source of power.

A further object of the invention is to provide, in a combination vehicle incorporating a crane, means whereby the crane itself may be utilized in making the change from a traction type vehicle to a wheeled vehicle or vice-versa.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

Figure 1 is a plan view of the frame, traction members and driving mechanism of a combination crawler and rail device constructed in accordance with a preferred embodiment of our invention.

Figure 2 is a view in side elevation of the device shown in Figure 1 and illustrating, in addition, a representative super-structure in the form of a power crane or shovel.

Figure 3 is a view in end elevation of the lower frame and the traction members of the device shown in Figures 1 and 2.

Figure 4 is a fragmentary view of the frame and the means used for mounting and supporting the rail wheels, and Figures 5 and 6 illustrate, diagrammatically, how a device constructed in accordance with our invention may be handled and maneuvered in preparation for use on rails or conversely in removing from the rails for use as an earth supported type of device.

Referring now to the drawings:

Figures 1 and 2 are illustrative of one type of vehicle in which our invention may be embodied and comprises, in general, a main or lower frame 10 mounted upon endless traction treads 11, a turntable 12 mounted on the frame, an upper platform 13 (Figure 2) supported for rotation above the turntable and carrying a power supply means in the form of a Diesel engine or the like, together with a conventional hoisting and operating mechanism, parts only of which are shown. The engine and the operating mechanism are enclosed by the cab 14.

Forward and rear rail wheel units, for use when the device is to be operated on rails, are indicated generally at 16 and 17 respectively.

The main or lower frame 10 may include the longitudinal beams 21—21 mounted on a pair of laterally extending beams 22—22. The beams 22 extend laterally beyond the longitudinal beams and are supported at their outermost ends on pairs of traction beams 23—23. The endless tracks are mounted on wheel sprockets 24 which are mounted on stub shafts 25 and journalled in bearing pedestals 26 affixed to the ends of these traction beams.

Power, provided by the engine previously mentioned, is usually transferred, in a device such as that shown, down through the axis of the turntable 12 by means of a vertical drive shaft 27. A main cross shaft 28 rotatably mounted in the lower or main frame receives its power from the vertical drive shaft through bevel gearing indicated at 29.

Sprockets 31 affixed to the outer ends of this main cross shaft 28 are operatively connected, by means of chain drives, to large driven sprockets 32, which members are affixed to the stub shafts 25. In practice, the cross shaft 28 is comprised of one central portion and two ends members with clutches and brakes interposed between the end or driven portions of the shaft and the central drive portion as indicated at 28a. These clutch and control members permit the individual operation of the crawler tracks and are constructed and controlled in accordance with common practice.

The forward rail wheel assembly 16, which, if desirable, may be duplicated on the rear of the vehicle, is shown in detail in Figures 3 and 4. The rail wheels 33 are fixedly mounted on a wheel axle 34. The crawler tracks of such devices are usually spaced sufficiently far apart to permit rail wheels of normal spacing to be placed between the treads.

The wheel axle 34 is mounted for free rotation in a pair of journal blocks 36 which are attached, as by welding, to a pair of swinging pedestals or links 37. The ends of these links opposite the journal blocks are received for free pivotal movement on a pair of pins 38 and these pins are mounted in brackets 39 extending outwardly from and bolted to one of the cross beams 22 of the main frame.

The entire wheel assembly may thus swing upwardly or downwardly about the pins 38 as a center and the links are of such length as to permit the wheels, when in raised position, to clear any obstacles, and when in lowered position and mounted on rails, to support the crawler treads a considerable distance above the ground for clearance.

Any suitable means and method may be used for raising or lowering the rail wheel assembly. Screw jacks or blocks and tackle (not shown) may be employed, but we have found that, in devices such as the one illustrated and embodying a crane, the hoisting mechanism of the crane itself may be utilized for the purpose.

The hoisting cable 41 may be brought down from the outer end of the boom 42 and looped over a snatch block 43. This snatch block may be mounted on the boom at a suitable distance from the axis of the turntable to be substantially vertical above the wheel axle. The hoist cable may be engaged to the axle by a loop of the cable and a hook, as shown at 44 in Figure 3, and the wheel assembly raised or lowered as desired.

The wheel assembly may be supported in its upper or disengaged position by means of ears or tabs 46 forming part of the journal blocks 36. These ears extend upwardly adjacent the longitudinal frame members 21 and pins 47 are installed through aligned holes in the ears and the frame members. The pins 47 may be fixed in position by cotter keys or the like.

In positioning the devices for rail operation, the entire vehicle is driven up on blocks as shown in Figures 5 and 6.

The blocks, such as shown at 48 and 48a, somewhat higher than the rails and having inclined ends, are placed just outside the rails in the positions shown, and other blocks 49 also placed inside and outside the rails, as shown, to form the essential parts of a loading platform or ramp. The vehicle is driven by its endless treads up on the blocks 48 and then pivoted about on one of the blocks to the position shown at 51 angular to and above the rails, from which position it may be driven forwardly on the blocks 48 and 48a to the position indicated at 52.

The wheel assemblies may now be dropped by the crane until they rest on the rails, as shown in dotted lines at 33a in Figure 6.

Spacing members or pedestals in the form of blocks 53 hinged as at 54 to the ends of the longitudinal frame members 21 are now moved downwardly about their hinge pins to positions between the journal blocks and the ends of the longitudinal frame members.

The vehicle may now be driven down off the blocks 48a to permit the entire weight of the structure to rest on the rail wheels and the vehicle may be towed or pushed to any desired location on the tracks.

It is preferable that a device such as we have described be adapted to propel itself along the rails as well as when operating on its endless treads. We have accordingly provided for driving one of the rail wheel assemblies from the same means as is used to drive the treads.

The general structure of such a driving means may be similar to the wheel assembly previously described but the pins 38 about which the wheel supporting links 37 may pivot, are replaced by a jackshaft 56. This jackshaft is operatively connected by means of sprockets and a drive chain 57 to a wheel axle 58 and the jackshaft itself is adapted to be selectively driven from the main cross shaft 28 through sprockets 59 and 61 and a chain drive 62.

A sliding jaw clutch 63, which may be splined to the cross shaft 28, is engageable with companion clutch members 64 and 66 connected to the rail wheel and crawler tread drive sprockets 59 and 31 respectively. These sprocket and clutch members are mounted for free rotation on the main cross shaft except when engaged with the sliding jaw of the clutch. The clutch may be operated by hand each time the vehicle is changed over from rail to crawler operation or vice-versa.

It is, of course, preferable that the sprockets driving the rail wheels be of suitable size to drive the rail wheels at a relatively high speed as compared to the crawler tracks.

It will be apparent, now, that we have devised a structure such as will greatly increase the range of adaptability of vehicles normally employing endless traction treads. A device such as we have described may be easily and quickly changed over from crawler treads to rail wheels and back again.

Furthermore, rail wheel assemblies, such as herein disclosed, are reliable and extremely simple as well as relatively inexpensive to manufacture. Such assemblies are particularly well adapted for transforming existing vehicles of the endless traction tread type into dual purpose devices.

We have provided a device, novel in its simplicity and practicability.

Although we have described a specific embodiment of our invention, it is apparent that modifications thereof may be made by those skilled in the art. For example, pneumatic tired road wheels may be used instead of rail wheels. Such modifications may be made without departing from the spirit and scope of our invention as set forth in the appended claims.

We claim as our invention:

1. In a vehicle having large area rotatable treads for support of the vehicle on the ground, an axle and wheels on the axle for alternative support of the vehicle on hard surfaces, links pivotally engaged to the vehicle frame and the axle to permit lowering of the wheels to permit the treads to clear the ground, bolsters for the wheel axle hingedly connected to extensions of the vehicle frame, the hinges being so disposed on the vehicle that the arc of travel of the bolsters at at least one point intersects the arc of travel of the axle in raising and lowering the wheels so that the bolsters may be disposed in position between the lowered axle and the vehicle frame extensions to hold the axles and wheels in lowered position to thus support the vehicle on the wheels.

2. In a vehicle having large area rotatable treads for support of the vehicle on the ground, an axle and wheels on the axle for alternative support of the vehicle on hard surfaces, links pivotally engaged to the vehicle and the axle to permit lowering of the wheels to permit the treads to clear the ground, bolsters for the wheel axle hingedly connected to extensions of the frame of the vehicle, the hinges being so disposed on the vehicle that the arc of travel of the bolsters at at least one point intersects the arc of travel of the axle in raising and lowering the wheels so that the bolsters may be disposed in position between the lowered axle and the frame extensions to hold the axles and wheels in spaced position relative to the frame extensions to thus support the vehicle on the wheels, and means for selectively driving the rotatable treads or the wheels including a transverse drive shaft, a double jawed clutch on each end of the drive shaft, means engageable by one of the jaws of each double jawed clutch for driving the rotatable treads, and means engageable by the other jaw of the double jawed clutch to drive the wheels, the latter means including a shaft journalled on substantially the same axis as the pivotal connection of one of the links with the vehicle, sprockets on the axle and on the shaft, and flexible drive means for the double jawed clutch to the shaft and from the shaft to the axle.

3. In a vehicle of the type described including a frame, a crane mounted thereabove, endless treads mounted at the sides of the frame, an axle and a pair of rail wheels mounted between the said endless treads and on each end of the frame, the means for mounting the rail wheels including links attached to the axles and hingedly connected to the frame, spacing means comprising bolsters hingedly supported by the frame and adapted to be swung into position between the free ends of said links and the frame to support the rail wheels in operative position, other means for supporting the rail wheels above the plane of the lowermost endless treads and out of operative position, and means including the crane and a cable controlled thereby and operating over a free running sheave supported adjacent the lower end of the boom of the crane for selectively raising and lowering the rail wheels relative to the frame.

4. In a vehicle of the class described, a main frame, crawler tracks mounted on two sides thereof, a power source and crane mounted on and above the frame, links pivotally connected to the main frame, a rail axle and rail wheels mounted in the free ends of the links whereby the axle and wheels may be swung downwardly by the links to a position below the endless tracks to support the vehicle on the wheels, means for holding the axle in the down position, other means for holding the axle in the up position where the wheels are above the plane of the endless tracks, and means including a hoisting cable on the crane and a sheave disposed on the boom of the crane substantially above the rail axle for raising and lowering the rail wheels relative to the crawler tracks.

5. In a vehicle of the class described, a main frame, crawler tracks mounted on two sides thereof, a power source and crane mounted on and above the frame, links pivotally connected to the main frame, a rail axle and rail wheels mounted on the free ends of the links whereby the axle and wheels may be swung downwardly by the links to a position below the endless tracks to support the vehicle on the wheels, means including a bolster block also pivotally attached to the main frame adapted to be swung to a position between the axle and the main frame or to a position out of the way of the axle in its upward movement, and means including a hoisting cable on the crane for raising and lowering the rail wheels relative to the crawler tracks.

6. In a vehicle of the type described having a lower frame, an upper frame rotatable thereabove and power means disposed on the upper frame, a pair of spaced endless tracks disposed on opposite sides of the lower frame, a power shaft disposed transversely between the endless tracks and directly below the axis of rotation of the upper frame, a vertical drive shaft and bevel gears for transmitting power from a power source above the upper frame to the said power shaft, the said power shaft comprising three pieces, a central drive shaft and a driven shaft at each end thereof, clutches for selectively or concurrently driving the driven shafts, jaw clutches on each of the driven shafts with the driving member of each clutch splined to its shaft and movable longitudinally thereof, chain and sprocket drive means for each endless track, a drive sprocket for each drive means rotatable upon a driven shaft, a jack shaft disposed transversely of the lower frame, a pair of links swingable thereabout, wheels and an axle journalled in the free ends of the links, a bolster for holding the axle and its wheels in lowered position, latching means for holding the axle in raised position, sprocket and chain means for driving the said axle from the jack shaft, sprocket and chain means for driving the said jack shaft, and a driving sprocket for the last mentioned driving means also rotatable on a driven shaft, the driving members of the jaw clutches adapted to be selectively or concurrently engaged with the endless tread driving sprockets or alternatively with the jack shaft driving sprockets.

7. In a vehicle of the class described, a lower frame having crawler tracks mounted on the sides thereof, an upper frame rotatable thereabove and including a crane, a pair of spaced links pivotally connected to the main frame, an axle and a pair of wheels mounted for rotation in the free ends of the links whereby the axle and wheels may be swung downwardly by the links to a position below the endless tracks to support the vehicle on the wheels, the frame members of the lower frame extending outwardly above the links, means including a bolster block hingedly attached to the extended portions of the lower frame members and adapted to be swung downwardly between said frame members and said links to support the frame from said wheels when in lowered position, and means including a hoisting cable on the crane for selectively raising and lowering the rail wheels relative to the crawler tracks.

8. In a vehicle of the class described, including a main frame, endless tracks on the main frame, at least one link pivotally attached to the main frame, an axle rotatably mounted in the link, a pair of rail wheels on the opposite ends of the axle, a bolster hingedly connected to the main frame and positioned to be swung downwardly between the axle and the main frame when the axle is in lowered position, and means for holding the bolster in position out of the way of the axle when the axle is in raised position.

DAVID W. LEHTI.
LUTHER H. CROW.